No. 655,447.　　　　　　　　　　　　　　　Patented Aug. 7, 1900.
J., A. & G. LYONS.
TRAY FOR STORING EGGS.
(Application filed May 13, 1899.)
(No Model.)
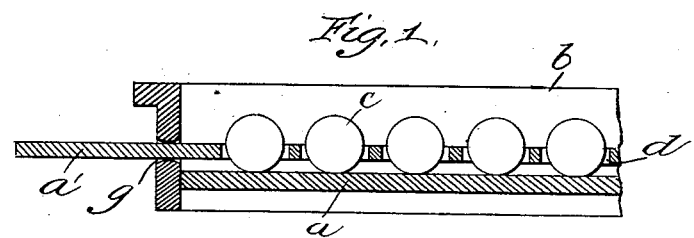
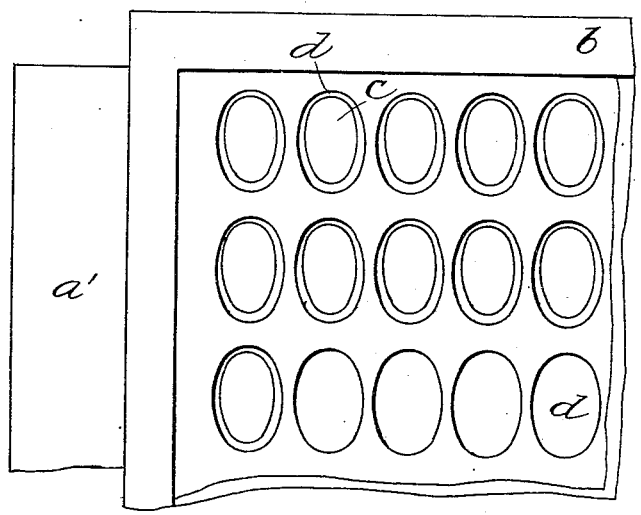
Inventors.
James Lyons.
Alfred Lyons.
George Lyons.

United States Patent Office.

JAMES LYONS, ALFRED LYONS, AND GEORGE LYONS, OF MANCHESTER, ENGLAND.

TRAY FOR STORING EGGS.

SPECIFICATION forming part of Letters Patent No. 655,447, dated August 7, 1900.

Application filed May 13, 1899. Serial No. 716,710. (No model.)

*To all whom it may concern:*

Be it known that we, JAMES LYONS, ALFRED LYONS, and GEORGE LYONS, subjects of the Queen of Great Britain, residing at Manchester, in the county of Lancaster, England, have invented certain new and useful Improvements in Trays for Storing Eggs, (for which we have made application for patent in Great Britain, No. 1,367, dated January 20, 1899,) of which the following is a specification.

Our invention relates to a tray for turning eggs; and it consists in the combination and arrangement of parts hereinafter described, and particularly pointed out in the claim.

In the drawings, Figure 1 is a sectional view of part of a tray. Fig. 2 is a plan view of so much of a tray as is necessary to understand our invention.

In the drawings, $a$ is the bottom of the tray, and $b$ the sides. The ends of the tray have openings $g$, through which a slide $a'$ passes, the openings being at such a distance above the bottom of the tray as to hold the slide $a'$ at a slight distance above said bottom. This slide is perforated, as shown at $d$, in such a manner that the openings will receive the eggs $c$. The eggs rest upon the bottom of the tray, and the walls of the openings engage the sides of the eggs, the eggs fitting loosely in the openings. From this it results that when the slide is moved the eggs will be turned, and thus preserved by preventing the yolk adhering to the sides of the eggs.

What we claim as our invention, and desire to secure by Letters Patent, is—

In a tray for storing eggs, wherein the eggs are turned through frictional contact with the tray-bottom, a rigid slide $a'$ mounted in the ends and a little above the bottom of the tray, the said slide being formed with egg-compartments $d$ and serving both to keep the eggs apart from each other and to turn same, substantially as described.

In witness whereof we have hereunto set our hands in presence of two witnesses.

JAMES LYONS.
ALFRED LYONS.
GEORGE LYONS.

Witnesses:
ALFRED BOSSHARDT,
STANLEY E. BRAMALL.